No. 702,845. Patented June 17, 1902.
A. WRIGHT.
DIRECT OR CONTINUOUS CURRENT ELECTRICITY METER.
(Application filed May 28, 1900.)
(No Model.)
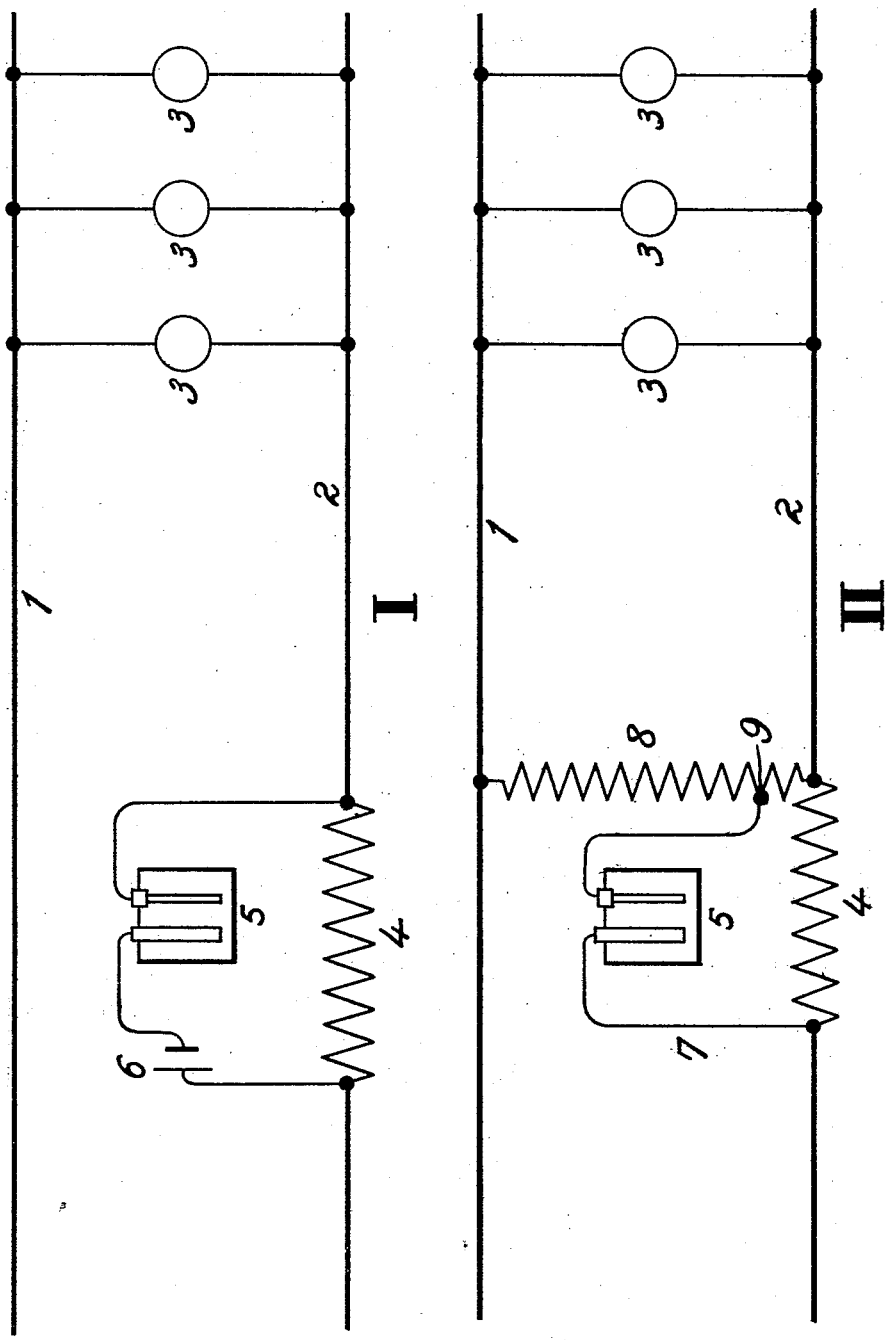
Witnesses:
F. T. Chapman,
C. E. Marshall.
Inventor:
Arthur Wright,
By Lyon & Bisny
Attys.

UNITED STATES PATENT OFFICE.

ARTHUR WRIGHT, OF BRIGHTON, ENGLAND, ASSIGNOR TO THE MUTUAL ELECTRIC TRUST, LIMITED, OF BRIGHTON, ENGLAND.

DIRECT OR CONTINUOUS CURRENT ELECTRICITY-METER.

SPECIFICATION forming part of Letters Patent No. 702,845, dated June 17, 1902.

Application filed May 28, 1900. Serial No. 18,309. (No model.)

*To all whom it may concern:*

Be it known that I, ARTHUR WRIGHT, a subject of the Queen of Great Britain, and a resident of Brighton, in the county of Sussex, England, have invented certain new and useful Improvements in or connected with Direct or Continuous Current Electricity-Meters, of which the following is a specification.

My invention relates to direct-current electrolytic meters by means of which the drawbacks arising from polarization or back electromotive force are obviated and the construction of accurate and reliable meters, through which only a fraction of the total current need be passed, is attained.

In the accompanying drawings, in which similar numerals represent similar or equivalent parts, Figure 1 is a diagram of the case in which an extraneous source of electromotive force is employed. Fig. 2 is a diagram illustrating the case in which the compensating electromotive force is obtained from the current traversing the main circuit.

In one way of carrying my invention for measuring direct currents into effect I place the electrolytic cell of the meter in shunt to an ohmic resistance, (which may be part of the main circuit,) and in this shunt-circuit or by-pass I place a battery or other extraneous source of electromotive force, the object of which is to make up for the back electromotive force of the electrolytic cell. This is diagrammatically illustrated in Fig. 1, in which 1 and 2 are the mains or leads in which the direct current passing is to be measured. 3 3 are lamps or other translators absorbing current. 4 is the ohmic resistance, 5 the electrolytic-meter cell, and 6 the primary battery or other extraneous source of electromotive force—such, for example, as a thermo-electric pile (heated by suitable electric or other means) or a secondary battery. Here it will be seen that the extraneous source of electromotive force is in shunt to the ohmic resistance and that it makes up for or counterbalances the back electromotive force of the electrolytic-meter cell. By this means I am enabled to use a direct-current electrolytic meter in a by-pass or shunt-circuit. Hitherto this has been impossible, since on account of the polarization in the electrolytic cell a definite portion of the current could not always be shunted, and consequently the whole of the current to be measured had to be passed through the said electrolytic cell, with its consequent loss of energy.

The method of employing a thermo-electric couple instead of a battery is obvious and does not require separate illustration.

In another way of carrying my present invention into effect instead of employing an extraneous source of electromotive force I obtain the electromotive force necessary to make up for the back electromotive force of the electrolytic cell from the supply-current to be measured—that is to say, from the current traversing the circuit of the house or other mains. In one way of carrying this part of my invention into effect I connect up one electrode of the electrolytic cell with one of the main conductors and the other electrode to a bridging lead or resistance between the said main conductors at such a point that an electromotive force is added in the electrolytic-cell circuit which shall counterbalance or compensate for the back electromotive force of the said electrolytic cell. I also place a resistance in one of the main conductors, say, between the points at which the bridging lead and the lead from one electrode join the said main conductor. This is diagrammatically illustrated in Fig. 2, in which 1 and 2 are the supply-conductors; 3, lamps or other translators; 4, the shunting resistance, and 5 the electrolytic-meter cell, as before. In this case I connect one electrode with one of the main conductors (say 2) by means of the lead 7, and the other electrode I connect to a bridging lead or resistance 8, extending between the main conductors 1 and 2 at such a point 9 that an electromotive force is added in the electrolytic-meter circuit, which counterbalances or compensates for the back electromotive force of the electrolytic cell.

It is thus apparent that the direct-current-measuring device, as shown in Figs. 1 and 2, comprises, essentially, an electrolytic cell or meter and a source of electromotive force arranged to counterbalance or compensate for the back electromotive force of the electrolytic cell. This source of electromotive force may be of any desired type, such as a battery, a thermal cell, a connection to the supply-mains, and the like.

Having thus described my invention, what I claim as new, and desire to secure by Letters Patent, is—

1. An electric measuring device for direct currents comprising an electrolytic meter and a means for producing a difference of potential arranged to counterbalance the back electromotive force of the meter, substantially as described.

2. An electric measuring device for direct currents comprising an electrolytic meter and a means for producing a difference of potential in series therewith arranged to counterbalance the back electromotive force of the meter, substantially as described.

3. An electric measuring device for direct currents comprising an ohmic resistance in the circuit and in a shunt thereto an electrolytic meter and a means for producing a difference of potential arranged to counterbalance the back electromotive force of the meter, substantially as described.

4. An electric measuring device for direct currents comprising an ohmic resistance in the circuit and in a shunt thereto an electrolytic meter and a means for producing a difference of potential in series with the meter, and arranged to counterbalance the back electromotive force of the meter, substantially as described.

5. The combination of a bridging resistance between the two direct-current mains or conductors, an ohmic resistance interposed in one of said conductors and an electrolytic meter one of whose electrodes is connected to a point on the bridging resistance between the two conductors and the other electrode to that conductor in which the ohmic resistance is interposed, substantially as described.

In witness whereof I have hereunto set my hand in presence of two witnesses.

ARTHUR WRIGHT.

Witnesses:
JOHN REID DICK,
JAMES G. LORRAIN.